Nov. 27, 1962 H. RUMSEY, JR 3,065,585
APPARATUS FOR PROCESSING MEAT PRODUCTS
Filed Dec. 9, 1959 5 Sheets-Sheet 3

INVENTOR.
HERBERT RUMSEY, JR.
BY
Kane, Dalsimer and Kane
ATTORNEYS

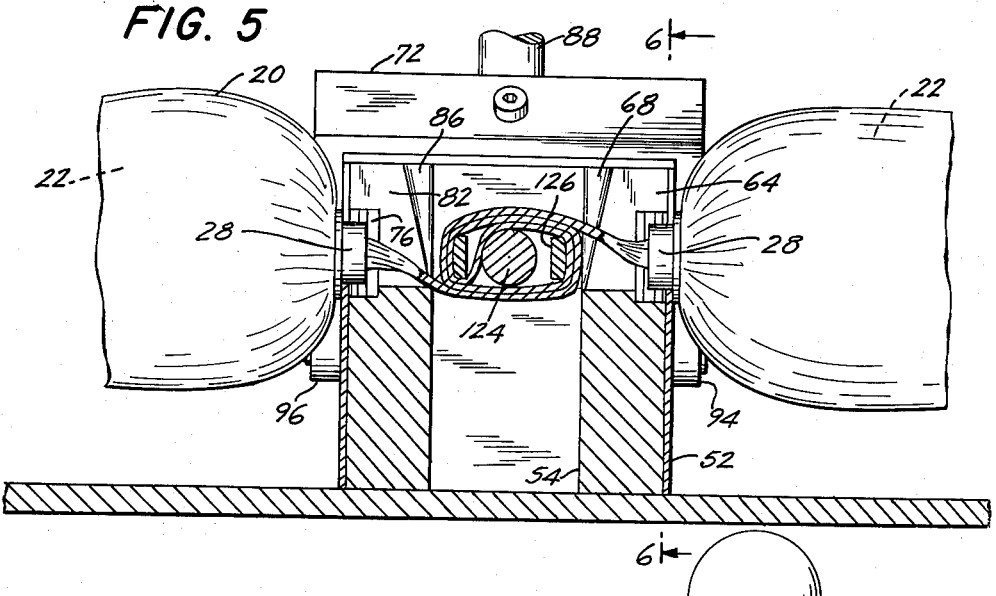
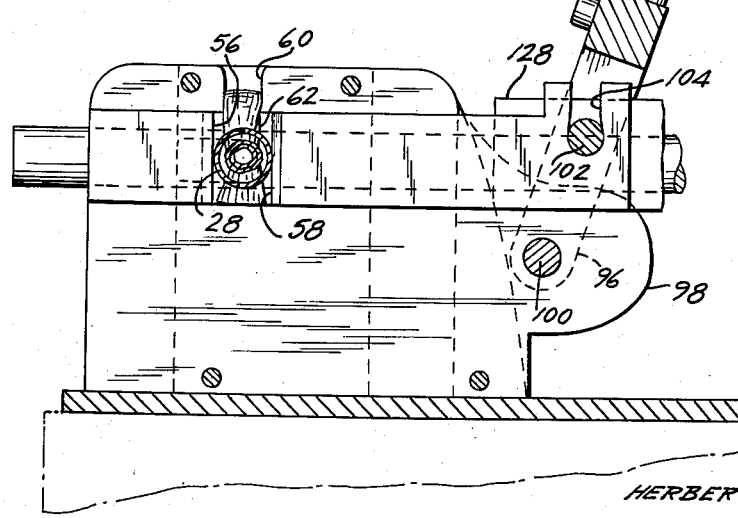

Nov. 27, 1962  H. RUMSEY, JR  3,065,585
APPARATUS FOR PROCESSING MEAT PRODUCTS
Filed Dec. 9, 1959  5 Sheets-Sheet 5
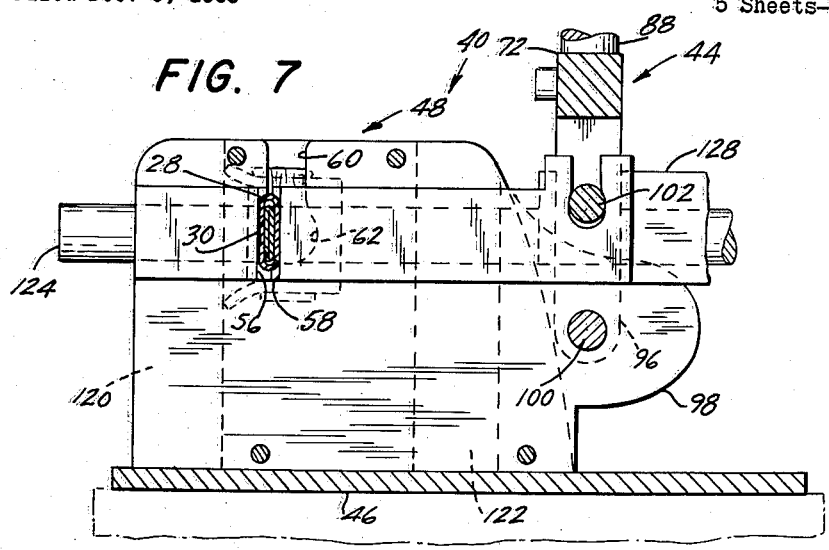
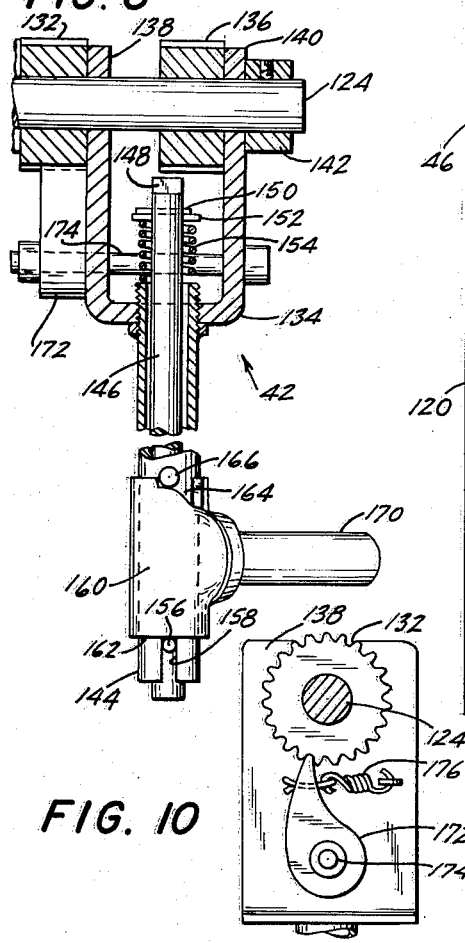
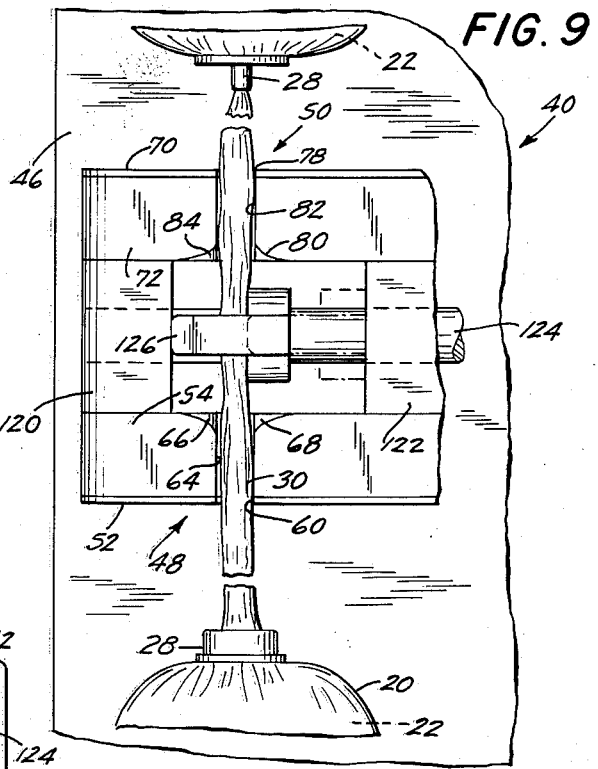
INVENTOR.
HERBERT RUMSEY, JR.
BY Kane, Dalsimer and Kane
ATTORNEYS

United States Patent Office 3,065,585
Patented Nov. 27, 1962

3,065,585
APPARATUS FOR PROCESSING MEAT PRODUCTS
Herbert Rumsey, Jr., P.O. Box 630, Rochester, N.Y.
Filed Dec. 9, 1959, Ser. No. 858,411
2 Claims. (Cl. 53—124)

This invention relates to meat packing, and more particularly to the processing of boneless meat products into a compressed state in casings.

An object of this invention is to provide a functionally and structurally improved apparatus for pressure-packing meat edibles into a casing wherein such edibles adjacent the casing ends are capable of being independently compressed therein and retained in this state during further packaging and product processing operations.

Another object is to provide an improved method of processing meat edibles into a pressurized condition within a casing and maintained in such condition during and subsequent to the clamping of the particular meat product therein.

A further object is to provide an improved method and apparatus for processing meat products in accordance with the disclosure in my prior patent application S.N. 820,547, filed June 15, 1959, of which the present application forms a continuation-in-part.

These and other objects and advantages will become apparent from the following detailed description which is to be taken in conjunction with the accompanying drawings illustrating practical embodiments of the invention, and in which:

FIG. 5 is a fragmentary sectional view substantially similar to that of FIG. 4 showing the operation of the stress-inducing mechanism with the meat products within the casing under a compressed state;

FIG. 6 is a sectional view taken along the line 6—6 of FIG. 5 showing the clamping mechanism of the pressure-packing apparatus in an open position;

FIG. 7 is a sectional view substantially similar to FIG. 6 showing the clamping mechanism in operative position for fastening the pressurized meat products within the casing;

FIG. 8 is a fragmentary sectional view of part of the apparatus illustrated in FIG. 2 showing the disengagement of the crank handle of the pressure-inducing mechanism;

FIG. 9 is a top plan view of the pressure-packing apparatus, with certain parts broken away and removed, illustrating the manner in which the gathered sectors of the casing between the compressed meat products clamped within the casing are untwisted with respect to the associated parts of the pressure-inducing mechanism of the pressure-packing apparatus;

FIG. 10 is a fragmentary elevational view of the pawl assembly of the apparatus for preventing the untwisting of the gathered sectors of the casing prior to the clamping operation.

Figure 1:
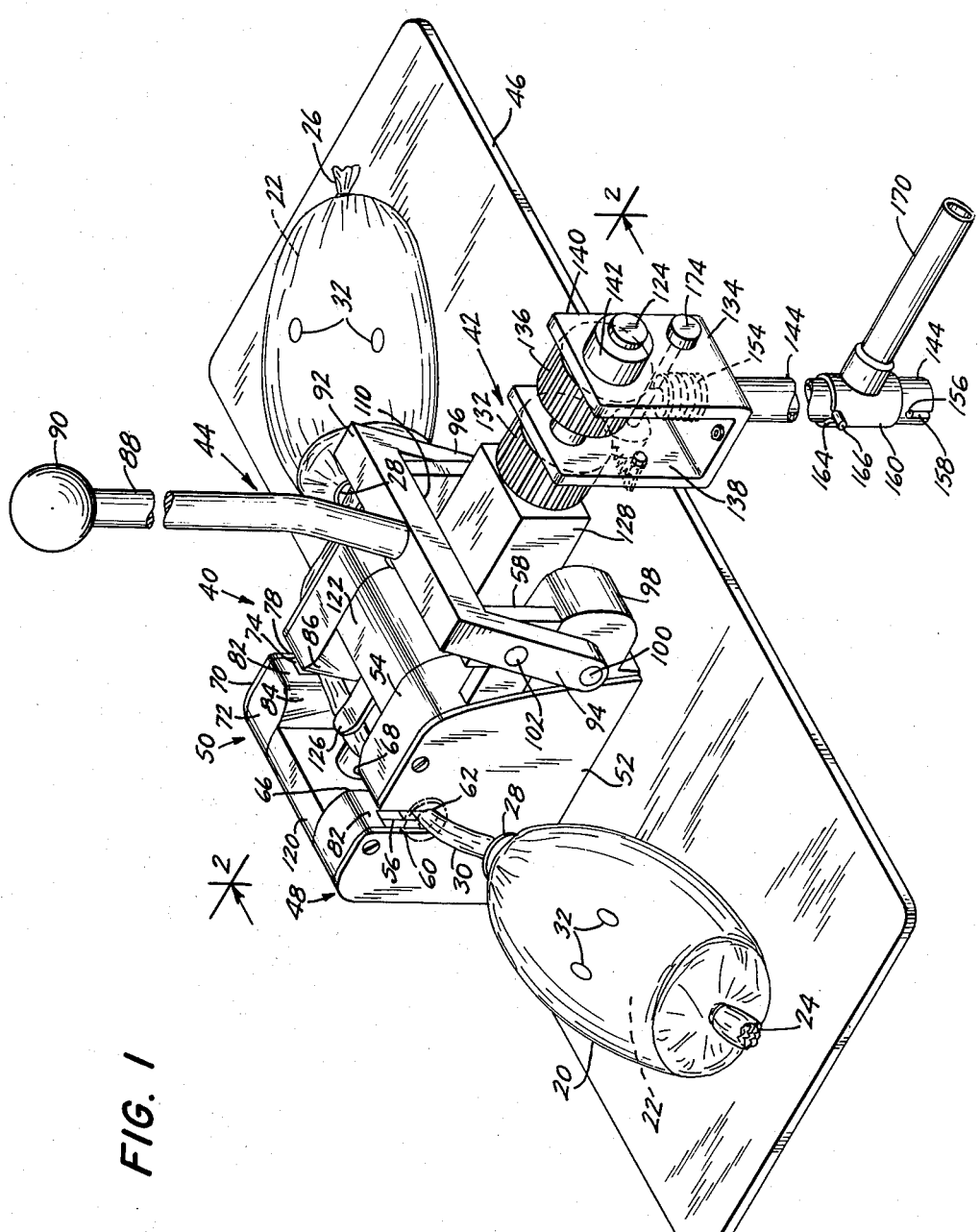
FIG. 1 is a perspective view of apparatus for pressure-packing meat edibles in accordance with the present invention with a meat product assembly positioned thereon prior to placing the apparatus in condition for pressurizing the contained meat edibles within the enclosing casing.

In the drawings, a casing 20 contains meat edibles 22 adjacent its terminal ends which are suitably secured by any one of the conventionally employed means 24 and 26. The casing 20 may be fabricated from cellulosic fiber sheet material or a stockinette-type of tubing. The meat edible 22, on the other hand, may encompass such products as boneless hams, shoulders, smoke butts, etc.

When a cellulosic fiber material such as hydrocellulose is employed for the casing 20, a wetting operation is utilized to increase the casing pliability and workability prior to the insertion of the selected meat edible therein. Under such conditions, a pair of deformable grommets 28 are first telescoped over the casing 20 in back-to-back relationship and, accordingly, define therebetween an intermediate gathered sector 30 of the casing 20. As illustrated, these grommets 28 include a tubular boss terminating at one end in a radially extending flange.

Although the contemplated hydrocellulose casings 20 are inherently porous to thereby facilitate the application of any subsequent smoking operation for the selected meat edibles 22, a number of openings 32 are either preformed or perforated to permit the escape of air entrapped within the casing upon the insertion of the meat edibles through the casing ends.

The meat product assembly thus formed is mounted on the pressure-packing apparatus 40 with the gathered intermediate casing sector 30 relatively expeditiously slipped into place for cooperation with the stress-inducing mechanism 42 and the grommets 28 advantageously located for deformation by the clamping mechanism 44. Under such circumstances, the contained meat edibles 22 will be conveniently supported by the base or platform 46.

Under such circumstances, the grommets 28 are adapted to be received by a pair of spaced closure support heads 48 and 50 which are suitably anchored to the platform 46. Closure support head 48 includes a pair of upstanding plates 52 and 54 which cooperate to mount complementary crimping jaws 56 and 58, of which jaw 56 is stationary and jaw 58 movable with respect to such upstanding plates 52 and 54. Plate 52 is provided with a vertical slot 60 having a width less than the diameter of the tubular section of the grommets 28. This slot 60 extends into a substantially circular opening 62 adjacent the slot base of sufficient diameter to readily receive this tubular section of the grommets 28. Opening 62, however, is of less diameter than the maximum effective diameter of the annular radial flange of the grommets in order to prevent them from being inserted entirely therethrough. As will be observed, the slidable or shifting crimping jaw 58 is adapted to traverse the slotted opening to thereby crimp the deformable tubular section of the grommets 28.

The plate 54 is similarly slotted at 64 and is provided with opposed beveled faces 66 and 68 extending from this slot. These beveled faces 66 and 68 facilitate the accommodation of the gathered central sectors 30 of the casing 20 disposed between the telescoped grommets 28; and they additionally cooperate to decrease and minimize the number of sharp edges adapted to encounter the casing 20 during the pressure packing operation.

Closure support head 50 is substantially similar and in most respects complementary to the closure support head 48. In this connection, plates 70 and 72 cooperate to mount a movable jaw 76 and a stationary jaw 74 which cooperate with one another to crimp the deformable grommets 28. Under such circumstances, the plate 70 is formed with a vertical slot 78 having a width of lesser dimension than the diameter of the tubular section of the grommets 28. This vertical slot 78 extends into a substantially circular opening 80 which is adapted to readily receive this tubular section, but at the same time prevent insertion therethrough of the annular radial flange of the grommets 28. The plate 72 is similarly formed with a vertical slot 82 which is associated with beveled faces 84 and 86 which tend to minimize the number of sharp edges to be engaged by the casing 20.

The crimping mechanism 44 is adapted to be actuated with one hand by a single lever arm 88 having its free end terminating in a handle or finger-gripping sphere 90. This lever arm 88 is connected by means of a linkage to the pair of movable crimping jaws 58 and 76 so that a pair of mounted grommets can be crimped substantially simultaneously. Thus, the lever arm 88 extends from a U-shaped or bifurcated member 92 having legs 94 and 96. Leg 94 is pivotally connected to an extension 98 of plate 54 by means of pin 100. This leg 94 is also pivotally connected intermediate its ends by a pin 102 to the sliding jaw 58. In this connection, the pin 102 is shiftable within slot 104 in this sliding jaw 58 and cooperates therewith to determine the extent of retraction of the jaw, as well as the amount of rotation of the bifurcated member 92, away from the closure support heads 48 and 50. Under such circumstances, the leg 96 of the bifurcated member 92 is pivotally connected to extension 106 of plate 72 of the closure head 50 by means of pin 108. The pin 110 serves to pivotally associate the leg 96 intermediate its ends with the sliding jaw 76 of the closure support head 50. Pin 110 is disposed within slot 112 in the sliding jaw 76 and cooperates therewith and is synchronized with the corresponding connection between the leg 94 to the sliding jaw 58 to determine the extent to which the crimping mechanism 44 is withdrawn to its inoperative position.

Thus, when the handle 90 is grasped and the lever arm 88 shifted inwardly, the crimping jaws 58 and 76 slide or shift towards the associated stationary jaws 56 and 78, respectively, to deform the tubular sector of the grommets 28 interposed therebetween. Upon the accomplishing of the desired crimping of the grommets 28, the lever arm is shifted rearwardly to retract the sliding jaws 58 and 76 to the inoperative position for the crimping mechanism 44.

Prior to the deformation of the grommets 28 which are positioned within the closure support heads 48 and 50, the meat edibles 22 are pressurized within the casing 20. To this end, a casing tension-applying or stress-inducing mechanism 42 is operated. Accordingly, a pair of spaced brackets 120 and 122 are suitably anchored to the platform 46 between the closure head supports 48 and 50. These brackets 120 and 122 rotatably mount an axially shiftable rod 124 having intermediate its ends a forked member 126. Upon the deliberate axial shifting of the rod 124, the bifurcated member 126 is adapted to assume an initial position illustrated in FIG. 2 at which it is adapted to clear that space between the closure head assemblies 48 and 50 which is aligned with the grommet-receiving openings. Thus, the central sectors 30 of the casing are permitted to be positioned properly between the closure head assemblies 48 and 50 without interference from the forked member 126. On the other hand, the rod 124, together with the bifurcated member 126, are adapted to be shifted axially to the position illustrated in FIG. 3 at which the forked member is adapted to lock for twisting the central sector 30 of the casing 20. The extent of axial shifting of the bifurcated members 126 and 124 is not only determined by the positioning of the bifurcated member 126 but spacing members which likewise cooperate with the upstanding bracket 122.

To this end, the rod 124 mounts a spacer block 128 and a collar 130 interposed between this block and the upstanding bracket 122. The free end of the rod 124 mounts a ratchet wheel 132 between the block 128 and angle bracket 134, which is not fixed to the rod 124, and adapted to be, under certain conditions, freely rotatable with respect thereto. Another wheel 136 having radially extending teeth is fixed to the rod 124 between the arms 138 and 140 of the U-shaped bracket 134. A collar 142 is substantially adjacent the end of the rod 124 and cooperates with collar 130 to maintain the interposed elements in their proper relative positions for association with one another. As will be appreciated, the present invention contemplates the association of parts on the rod 124 such that the bifurcated member 126 will be shiftable between an operative and inoperative position whereby the central sector 30 of the casing 20 may be properly twisted and disengaged respectively.

As stated in the foregoing, the rod 124 is journaled in brackets 120 and 122. To this end, a tube 144 is threadedly secured to the web of the bracket 134. A shiftable rod 146 is disposed within the bore of the tube 144 and is adapted to engage the teeth of the wheel 136. In this connection, the rod 146 is formed with a beveled end 148 and aditionally mounts a pin 150 at this inner end. This pin 150 cooperates with washer 152 in positioning a biased spring 154 around the rod 146 and against the inner end of tube 144. The distal end of the rod 146 includes a laterally extending pin 156 which is adapted to travel in a longitudinally extending slot 158 in the associated end of the tube 144. Under normal circumstances, the spring 154 will bias the beveled end 148 of the rod 146 into engagement with the teeth of wheel 136 so that when the tube 144 is deliberately swung, the rod 124, and consequently the bifurcated member 126, will rotate.

Provisions are made for causing the disengagement of the beveled end 148 of the rod 146 from the teeth of the wheel 136. In this connection, a tubular sleeve 160 is shiftably mounted on the tube 144 with one of its ends 162 adapted to bear against pin 156. The other end of the sleeve 160 includes a cam face 164, substantially as illustrated, for the purpose of engaging a pin 166 projecting laterally from the tube 144. Thus, rotation of sleeve 160 with respect to its mounting tube 144 in one direction will force the sleeve 160 to be displaced towards the terminal end of the tube 144, and consequently move pin 156 such that the rod 146 will be retracted and the beveled end 148 disengaged from the wheel 136 against the bias of spring 154. The formation of parts is such that the spring 154 will not automatically effect the return of the engagement of the beveled end 148 with the teeth of the wheel 136, but the rod 146 will remain in this retracted position. Obviously, a reverse movement of the sleeve 160 with respect to its mounting tube 144 will permit the beveled end 148 of the rod 146 to fall back into engagement with the teeth of the wheel 136. The movement of the sleeve 160 on the tube 144 is facilitated by a handle 170 extending laterally from the sleeve 160. In addition, this handle 170 is utilized in swinging the tube 144 to effect rotation of the bifurcated member 126.

Under most circumstances, it has been found to be extremely desirable to lock the forked member 126 upon completion of a suitable amount of twisting of the central sector 30 of the casing 20 in placing the meat edibles 22 and casing 20 under a suitable amount of stress to effect the proper pressure packing contemplated by the present invention. In this connection, these stresses will be maintained prior and contemporaneously with the grommet deformation by the crimping mechanism 44. Accordingly, the handle 170 need not be grasped during this stage of the packaging process so that either the crimping may be performed more proficiently or other work and duties prepared or accomplished during grommet crimping.

A pawl 172 is pivotally mounted on bracket 134 by means of pin 174 which extends through both of the bracket legs 138 and 140. This pawl 172 meshes with the teeth of the ratchet wheel 132 and is influenced into such engagement by the bias of spring 176. Thus, when the tube 144 is swung during a twisting operation such that the rod 124 is rotated in a counterclockwise direction with the pawl 172 traversing substantially the same radius of rotation, the block 128, together with rachet wheel 132, will remain stationary. When the desired amount of rotation is attained in adequately twisting the central sectors 30 of the casing 20, the pawl 172 in cooperation with the ratchet wheel 132 will prevent any reverse movement of the rod 124. However, upon disengagement of the beveled end 148 of the retractable rod 146 from the teeth of the wheel 136, the rod 124 will be permitted to rotate independently of the tube 144. Under such circumstances, the ratchet wheel 132 and pawl 172 will not lock the rod 124 relative to a stationary member.

The central sectors 30 of the casing 20 may now be untwisted by merely exerting opposed forces on the spaced meat edibles 22 within the casing 20 after the desired crimping operation has been accomplished to cause the rod 124, and consequently the bifurcated member 126, to rotate relative to the brackets 120 and 122. The rod 124 may then be retracted axially to free the bifurcated member from the untwisted central sectors 30 of the casing 20 to permit the meat product assembly to be lifted from the pressure-packing apparatus 40.

Figure 2:
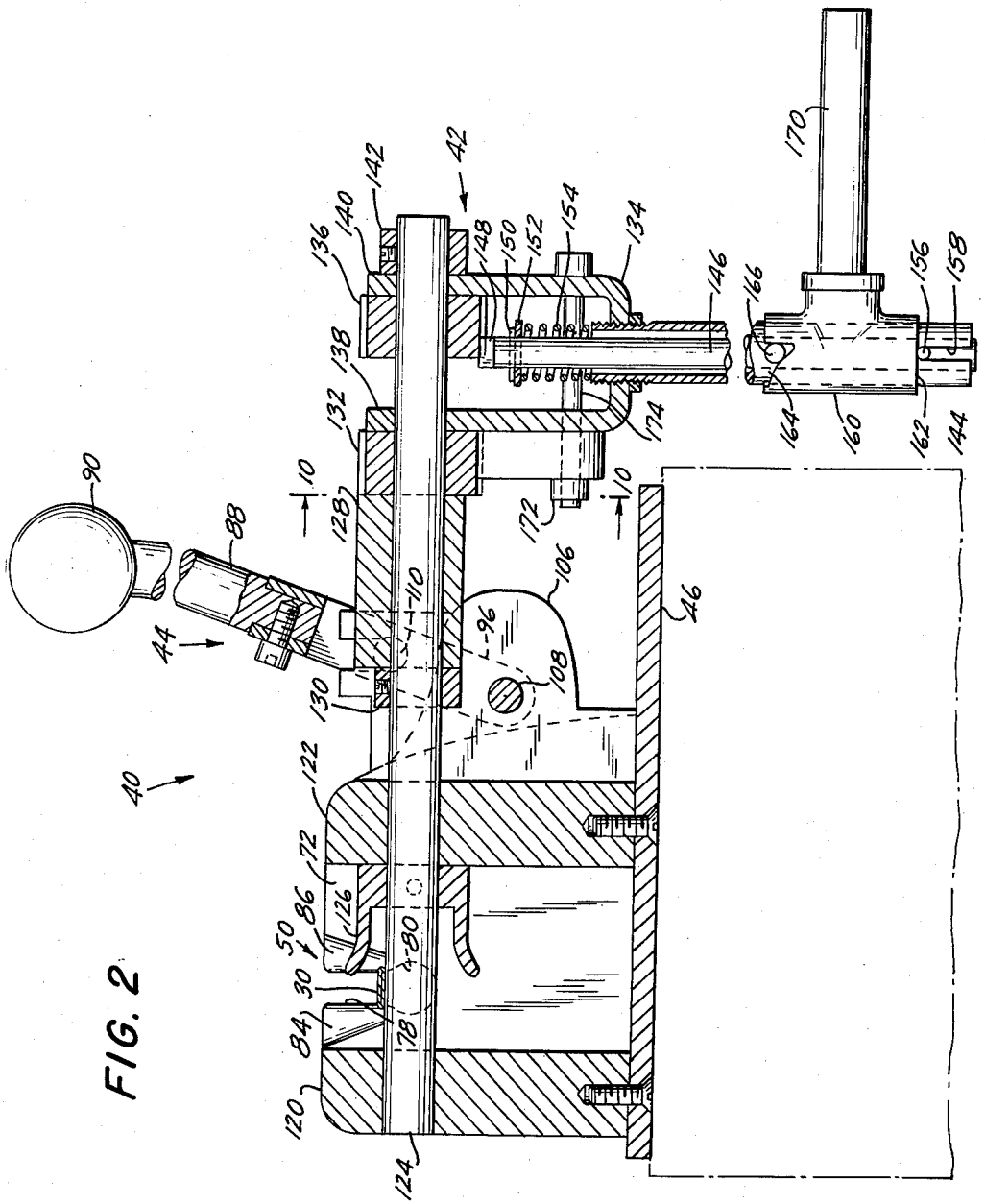
FIG. 2 is a cross-sectional view taken along the line 2—2 of FIG. 1.
Figure 3:
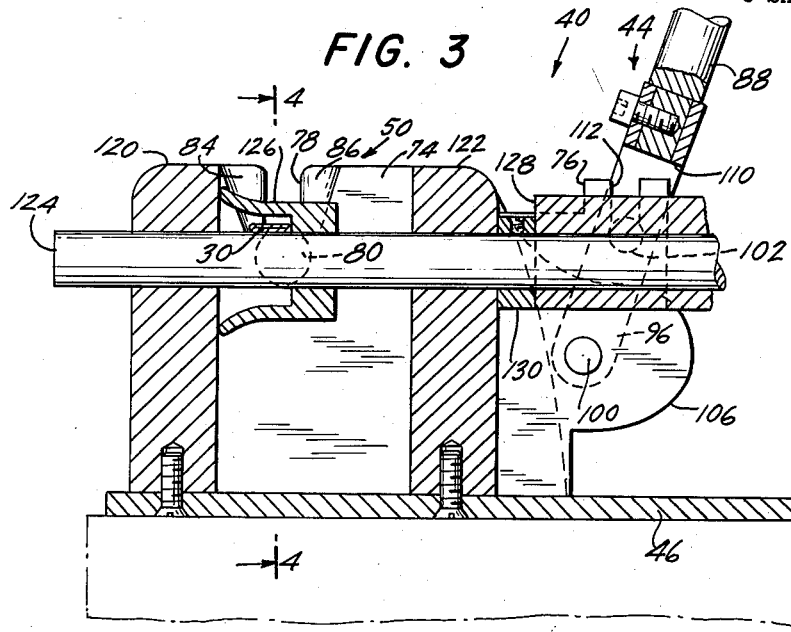
FIG. 3 is a fragmentary view of part of the apparatus illustrated in FIG. 2 showing the manner in which the gathered intermediate sectors of the casing are locked with respect to the stress-inducing mechanism of the pressure-packing apparatus.
Figure 4:
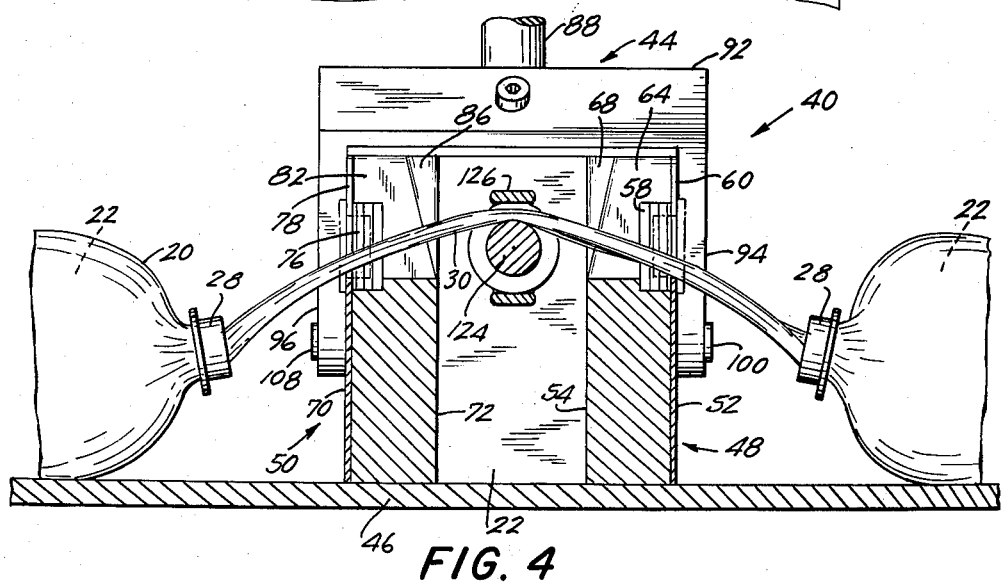
FIG. 4 is a fragmentary sectional view taken along the line 4—4 of FIG. 3.

In operation, the unstressed meat edibles 22 within casing 20 are placed on the platform 46 with the gathered central sector 30 suspended over rod 124 in a manner substantially as illustrated in FIGS. 1 and 2. The retracted stress-inducing mechanism 42 is then shifted inwardly such that the forked member 126 locks the gathered sector 30 in the apparatus with the tubular sector of the grommets 28 having been properly mounted in the associated closure support heads 48 and 50. Thus, prior to the twisting operation of the central sector 30, the apparatus, together with the unstressed meat product assembly, will assume the relationship illustrated in FIGS. 3 and 4. The stress-inducing mechanism 42 is then manually actuated to twist the engaged central sectors 30 of the casing 20 about the forked member 126. The casing 20 is then tensioned through the grommets 28 to thereby compress the meat edibles 22. When the desired amount of pressurization of the meat edibles 22 is obtained, the compressed state of the meat edibles will be maintained as a result of the engagement of the pawl 172 with the ratchet wheel 132, notwithstanding any ungrasping of the handle 170. In this connection, the twisting of the central sectors 30 of the casing 20, as well as the relative disposition of parts of the pressure-packing apparatus 40 and the meat product assembly at this stage, are partially illustrated in FIGS. 5 and 6.

The sliding jaws 58 and 76 are shifted inwardly at this time by means of manual pressures exerted on handle 90 through the interconnecting structure to thusly crimp the associated tubular section of the grommets 28. Under such circumstances, the pressurized condition of the meat edibles 22 will be maintained within the casing 20. The slidable crimping jaws are then opened and substantially simultaneously therewith, with either the other or same hand, the sleeve 160 is shifted on tube 144 by means of handle 170 to retract the rod 146 and thereby cause disengagement of the beveled end 148 of this rod with the teeth of the wheel 136. The gathered central sectors 30 of the casing 20 may now be untwisted by simply pulling apart or applying opposed forces to the contained meat edibles 22 to cause the rod 124 to reverse in direction independent of the bracket 134. The gathered central sectors 30 will not be extended substantially as illustrated in FIG. 9. The stress-inducing mechanism 42 need only be retracted relative to the brackets 120 and 122 to permit the removal of the contained pressurized meat edibles 22.

If a smoking operation is contemplated for the packed meat edibles 22, the compressed meat products are then suspended from a smoking tree (not shown) in a manner substantially similar to that disclosed in the aforementioned parent application. The inherent porosity of the contemplated materials for the casing 20, together with the apertures 32, permit uniform and thorough penetration of the meat edibles 22 during this operation. Since the meat edibles 22 are preferably inserted into casing 20 while the latter is in a substantially wet condition, this smoking operation will ultimately dry the casing which molds firmly about the compressed contained product. As disclosed in the aforementioned application, this molding is of such a nature that when the casing 20 is dried, the crimped grommets 28, as well as ends 24 and 26, may be severed without affecting appreciably the casing or the contained product. As will be appreciated, other drying techniques can be employed and are known to the art in the absence of a smoking operation.

It should be understood that more than two meat edibles may be packed within casing 20, and in this connection reference is made to the above-mentioned application.

Obviously, the aforementioned objects and advantages are thusly most effectively attained. Although a single preferred embodiment of the invention has been disclosed and described herein in detail, such is merely for purposes of illustration, and it is intended that the invention not be limited thereby. Since the present invention may be varied from that illustrated and described, its scope, accordingly, is to be defined by the appended claims.

I claim:

1. A machine for pressure-packing meat products within a casing for holding compressible meat edibles comprising in combination: at least one closure support for supporting a deformable closure having a passageway therein through which passageway said casing is adapted to be inserted; stress-inducing mechanism adjacent said closure support for compressing said edibles within said casing by moving sectors of said casing relative to said closure and closure support, said stress-inducing mechanism being rotatable and adapted to twist the engaged sectors of said casing; deforming means operatively coupled with said closure support for clamping said closure tightly to said casing to keep said edibles within said casing compressed; a locking means for maintaining said edibles under a predetermined compressed state independent of clamping of said closure, said locking means being cooperable to prevent untwisting of the twisted engaged sectors of said casing to maintain said meat edibles in a compressed state within said casing; release means for releasing said locking means so that the compressed meat edibles within said casing subsequent to the clamping of said closure are free to be removed from said stress-inducing mechanism, and said release means being rotatable with said mechanism during the twisting of the engaged sectors of the casing and being adapted to be disassociated from said mechanism to permit the untwisting of the twisted engaged sectors of said casing subsequent to the clamping of said closure.

2. A machine for pressure-packing meat products within a casing for holding compressible meat edibles comprising in combination: at least one closure support having a passageway therein through which passageway said casing is adapted to be inserted; stress-inducing mechanism adjacent said closure support for compressing said edibles within said casing by moving sectors of said casing relative to said closure support, said stress-inducing mechanism being rotatable and adapted to twist the engaged sectors of said casing; means for clamping said casing to keep said edibles within said casing compressed; locking means for maintaining said edibles under a predetermined compressed state independent of said clamping, said locking means being cooperable to prevent untwisting of the twisted engaged sectors of said casing to maintain said meat edibles in a compressed state within said casing; release means for releasing said locking means so that the compressed meat edibles within said casing subsequent to said clamping is free to be removed from said stress-inducing mechanism and said release means being rotatable with said mechanism during the twisting of the engaged sectors of the casing and being adapted to be disassociated from said mechanism to permit the untwisting of the twisted engaged sectors of said casing subsequent to said clamping.

References Cited in the file of this patent

UNITED STATES PATENTS

| | | |
|---|---|---|
| 1,673,683 | Ingram | June 12, 1928 |
| 2,107,166 | Rumsey | Feb. 1, 1938 |
| 2,247,312 | Rumsey | June 24, 1941 |
| 2,677,487 | Friedman | May 4, 1954 |
| 2,711,848 | Capps | June 28, 1955 |
| 2,713,449 | Carmichael | July 19, 1955 |
| 2,718,991 | Rabinowitz | Sept. 27, 1955 |
| 2,831,302 | Jensen et al. | Apr. 22, 1958 |
| 2,884,749 | Palmer et al. | May 5, 1959 |
| 2,899,785 | Gebhardt | Aug. 18, 1959 |